Sept. 10, 1946.  A. A. ASHTON  2,407,392

DRIVE FOR TRIPLEX PUMPS

Filed Jan. 15, 1945  2 Sheets-Sheet 1

Inventor
ALBERT A. ASHTON

Attorney

Sept. 10, 1946.    A. A. ASHTON    2,407,392
DRIVE FOR TRIPLEX PUMPS
Filed Jan. 15, 1945    2 Sheets-Sheet 2

Inventor
ALBERT A. ASHTON
By
Attorney

Patented Sept. 10, 1946

2,407,392

UNITED STATES PATENT OFFICE 2,407,392

DRIVE FOR TRIPLEX PUMPS

Albert A. Ashton, Houston, Tex., assignor to Emsco Derrick & Equipment Company, Los Angeles, Calif., a corporation of California Application January 15, 1945, Serial No. 572,816

9 Claims. (Cl. 74—44)

This invention relates to triplex pumps and particularly to the driving mechanism, or power end, thereof.

It is an object of this invention to provide a triplex pump which will be driven by a driving mechanism including but two driving pinions, and by, in effect, a single unitary driven gear constituting a duplex driven gear set having two gear wheels unitary with each other and with the driven shaft. That is to say, the invention includes a single duplex driven gear on a single driven shaft for transmitting power to the three pistons of the triplex pump.

It is commonly the practice to employ, in the power end of triplex pumps, driving and driven gears having herringbone teeth, or duplex inclined teeth, to preclude unbalanced end thrusts upon the bearings or mountings of the drive and driven shafts and upon the remainder of the driving mechanism.

It is an object of the present invention to eliminate the necessity for the employment of herringbone teeth on either the driving or the driven parts of the power end of triplex pumps, while nonetheless balancing and cancelling the parallel, opposed end thrusts inevitably arising hitherto in such mechanisms.

This feature is of particular importance when employing the present single duplex driven member which includes an eccentric and an eccentric rod between its inner faces, since, although herringbone teeth are undesirable, yet these unbalanced end thrusts unless precluded in some manner would come strenuously upon the included eccentric rod with deforming and other results of such a serious nature as to render the mechanism inoperative in the course of time.

Most drive mechanisms for triplex pumps, especially those employed in the oil industry, utilize split-type eccentric straps, which are inherently of a rather unreliable and weak construction and nature, and are difficult and tedious to install.

It is an object of the present invention to obviate the employment of split-type eccentric straps in triplex pump drive mechanisms, even in cases where the driven gears are of a unitary duplex nature including an eccentric and eccentric strap between the inner faces of the unitary duplex driven gear assembly. That is to say, the invention aims to provide such a construction of the driven gear assembly in triplex pumps that, although the eccentric in such duplex driven gears is ordinarily inaccessible for the application thereto of anything but a split-type strap, the present eccentric can be easily and quickly fitted with a continuous circular one-piece eccentric strap. This strap can hence be strongly made as an integral circle, forged out of steel, for example.

It is another object of the invention to provide a cross head guide for the eccentric rod head and a packing gland for the piston rod united therewith so that the hitherto unrenewable cross head guide or the packing gland can be readily replaced with a new one, instead of having to replace the entire driving assembly.

The other objects and advantages of the invention will be made manifest as this disclosure progresses.

The presently preferred embodiment of the above and other inventive concepts are shown by way of example in the accompanying drawings and will be described hereinafter in detail in conjunction with said drawings. It is to be understood, however, that the specific disclosure is merely illustrative and that the inventive concepts can be embodied in any form lying within the scope of the accompanying claims without departing from the ambit and spirit of the invention.

In these drawings,

Fig. 3 is a detailed sectional view on line 3—3 of Fig. 1, sighting in the direction of the arrows.

Figure 1:
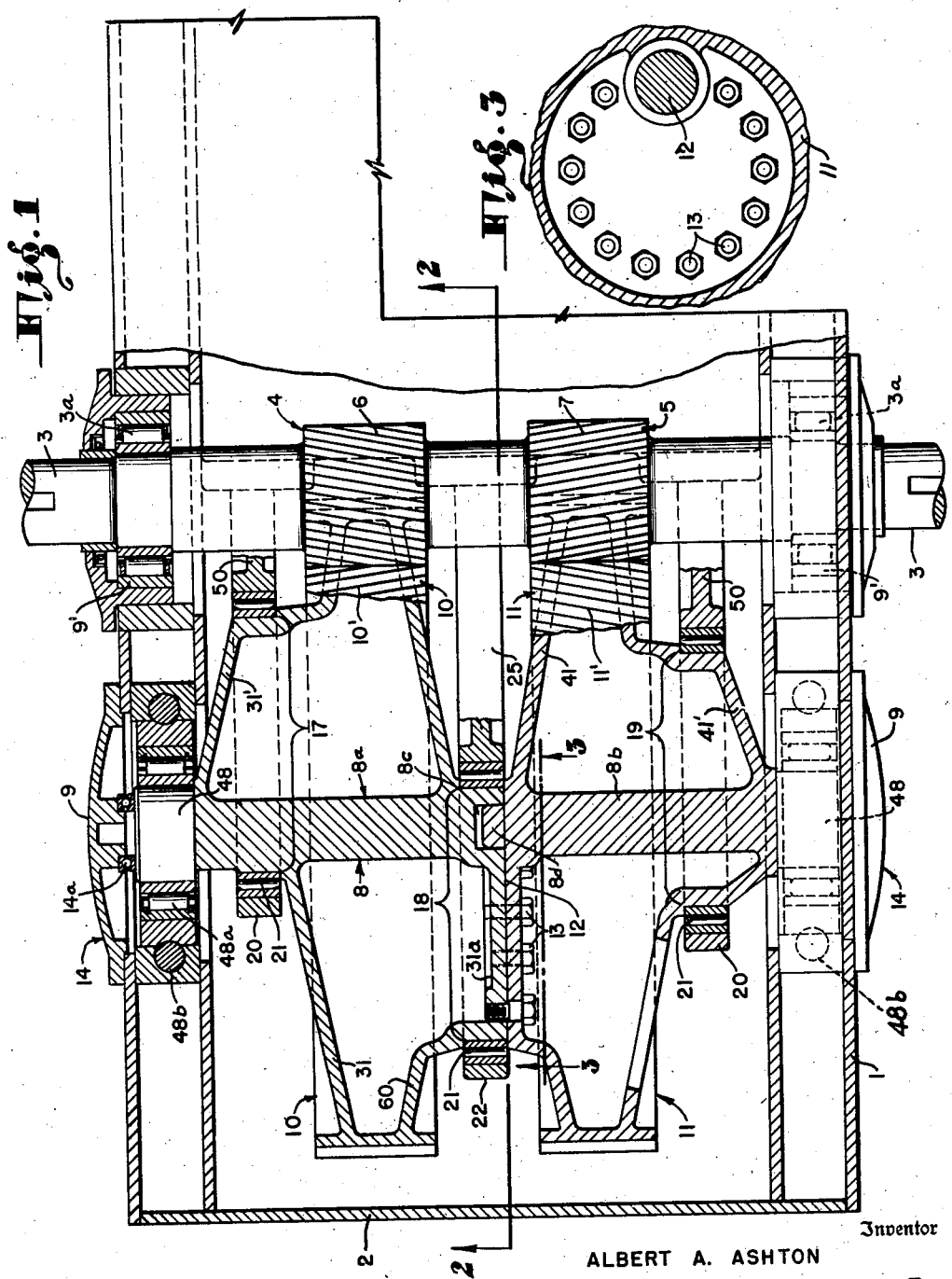
Fig. 1 is a substantially horizontal fragmentary section of the horizontally arranged power end of the present invention.

The construction shown in the drawings includes a bed or base 1 for the driving mechanism lying substantially horizontal on a suitable foundation, not shown; a cover or casing assembly 2, enclosing the mechanism in a substantially weatherproof manner; a power input member or drive shaft 3; and suitable power transmitting and transforming members interposed between the drive shaft and the triplex pump cylinders.

By virtue of inventive constructions, later particularized, the drive shaft 3 is constructed with but two driving pinions 4 and 5 thereon, and these pinions are preferably fabricated integral therewith at longitudinally spaced locations. The driving pinion 4 bears on its periphery a plurality of teeth 6 arranged in a single-spiral manner. That is to hay, the teeth 6 extend fully across the face of the pinion in parallelism with each other and all slope at the same angle or pitch. There is but one set of teeth on each pinion and, in the embodiment shown, these teeth slope downwardly from left to right. The driving pinion 5 also bears similar teeth 7, reversely arranged in parallelism around the periphery of the pinion, and inclined downwardly from right to left; that is to say, in a direction opposite to that of the inclination of the teeth on the pinion 6.

Figure 2:
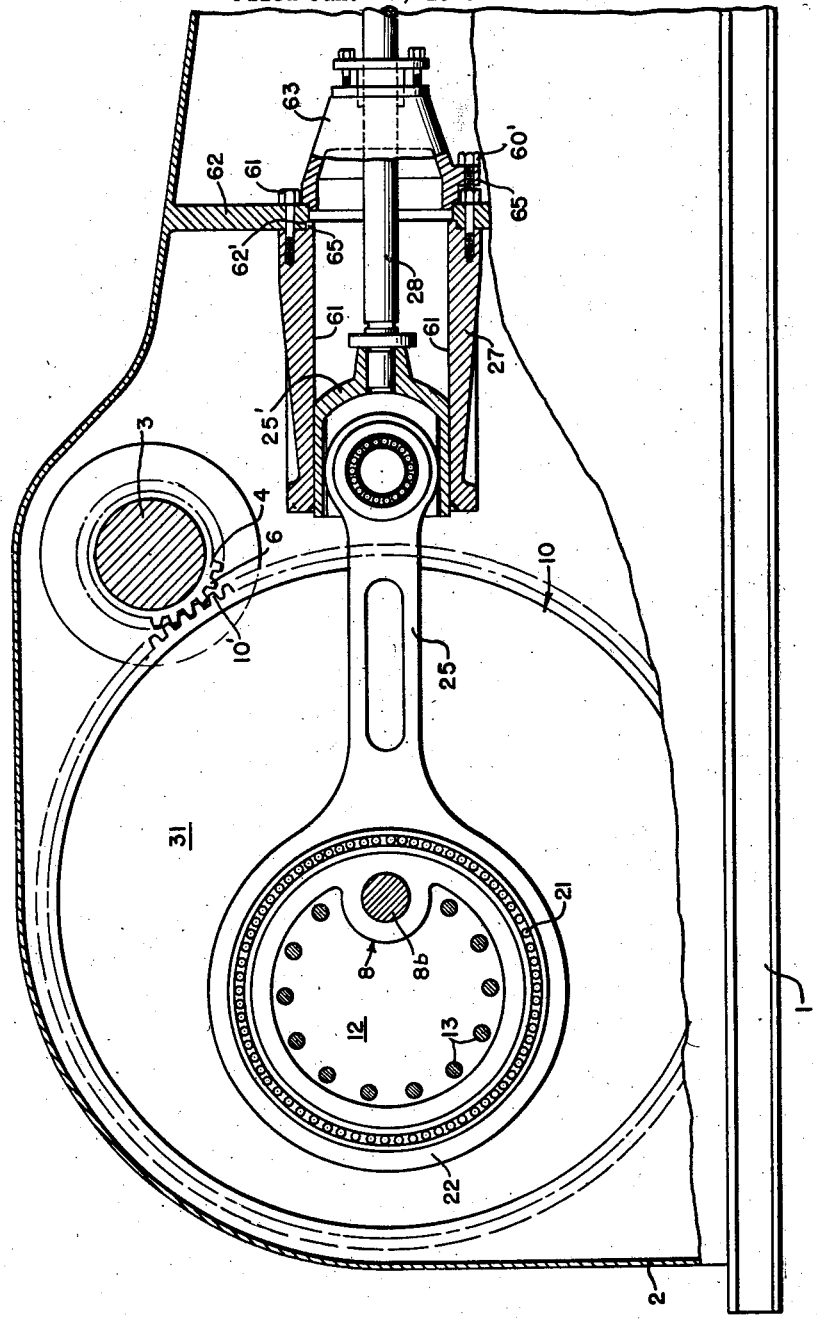
Fig. 2 is a substantially central vertical section on line 2—2 of Fig. 1, sighting in the direction of the arrows.

As best seen in Fig. 2, a shaft generally designated by the reference numeral 8, is provided in the mechanism and lies somewhat to the left of and below the drive shaft 3 and is adapted to be driven thereby. The driven shaft includes two halves, 8a and 8b; that is, shaft 8, considered longitudinally, is divided into two substantially identical lengths substantially at the middle of the drive mechanism. The two lengths are of equal diameter. The shaft half 8a bears on its inner end a socket 8c for receiving a protuberance or stub 8d on the adjacent end of shaft half 8b.

The outermost end of each shaft half is provided with a journal 48. A journal box 14 is provided for each journal. Within each journal box is provided a roller bearing unit 48a held in place by bolts 48b. If desired, the extreme outer ends of each shaft half may be provided with thrust bearings 14a, but for reasons hereinafter particularized, end thrust bearings are not essential. Each journal box is provided with a cover 9 affording a seat for these thrust bearings. The drive shaft 3 is provided with suitable roller bearings 3a mounted in the journal box 9'.

Although the triplex pumping system includes three pumps in parallel, only one driven gear, in effect, is provided on the driven shaft of the power transmitting mechanism. This gear is a duplex driven unit and comprises two halves, 10 and 11, these gear halves and their corresponding shaft halves being so constructed and associated with each other as to constitute but a single duplex unit. Each member 10 and 11 of the duplex unit comprises a rigid, relatively lightweight hollow body with a circular periphery integrally united by outwardly extending webs 31 and 41, respectively, with its respective shaft half, the periphery, the web and the shaft half being a one-piece casting.

The web 31 in the region thereof that lies near the upper outer face of the gear 10 is so laterally extended and configured as to form a protuberance 31' lying entirely to the forward direction of the corresponding shaft half and the outer face of the lower half of the web is extended laterally in the opposite direction, as shown. An eccentric 17 is machined, cast or otherwise formed to lie in a plane at right angles to the shaft half 8a, occupying the periphery of the outward lateral extension of the web and is therefore integral with the gear, web, and shaft half.

The other member of the duplex driven gear unit is constructed on the same principle, but in a reverse manner, the web 41 being extended oppositely to the extension 31' of the web 31 and having an extension 41' laterally adjacent to the extension 60 of the gear 10. That is to say, the shaft half 8b is also integral with a circular toothed periphery and with a uniting web extended in opposite directions on opposite sides of the shaft half. An eccentric 19 is machined, cast or otherwise formed on the periphery of the outer extension of the web 41.

Each of the members 10 and 11 bears a plurality of spiral teeth, 10' and 11', on its periphery so arranged and shaped as to engage and mesh with the respective teeth 6 and 7 of the pinions 4 and 5 respectively. However, the teeth 10' are pitched or inclined downwardly from right to left in a direction opposite to the pitch of the teeth 6, and the teeth 11' are pitched downwardly from left to right in a direction opposite to the inclination of the teeth 7. By virtue of this construction and arrangement, the end thrust generated by the meshing of teeth 6 with teeth 10' is opposed and equalized by the end thrust generated by the meshing of teeth 5 with teeth 11'. Accordingly, no unbalanced outwardly directed thrust force of any appreciable magnitude can come upon any portion of the drive mechanism. This feature is of particular importance in relation to the central eccentric, eccentric strap, and eccentric rod, to be later particularized.

Each of the members 10 and 11 is provided, on the interior face of that half thereof which lies opposite to the pinions, with a flat vertically extending circular formation, which formations meet on the plane 12, shown in Fig. 1.

The two shaft halves and the two gear wheels are adapted to be united rigidly into a rotatable duplex member which is, in effect, a single gear and crank unit. There are united at this junction plane by means of stud bolts 13 distributed equidistantly around the periphery of the abutting circular faces, the bolts passing through both webs thereat and being anchored thereto.

That portion of the web 31 which lies closest to the plane 12 is formed so as to provide an eccentric protuberance 31a which is machined so as to provide an eccentric 18, normally having a throw or offset that, in any position of the rotation of shaft 8, lies oppositely to the common throw of the eccentrics 18 and 19.

The outer eccentrics 17 and 19 are provided with slip-on type eccentric straps 20, each of which cooperates with an eccentric rod 50 extending forwardly for operating respective piston rods of respective ones of the triplex pumps. Each of these eccentric straps and eccentrics has a needle bearing 21 interposed between them.

The middle eccentric 18, however, is rather inaccessible, especially from the sides, and would ordinarily be provided with an eccentric strap so constructed with a split as to enable the application of the strap in respective halves, one at a time, to the eccentric. That is to say, this eccentric would ordinarily be provided with an eccentric strap slit horizontally so that half of the strap could be fitted onto the eccentric from the top thereof and the other half of the strap fitted from the bottom side of the eccentric, the two then being bolted together. However, by virtue of the present construction and arrangement of the shaft halves, of the webs and of the toothed peripheries, the present construction obviates the necessity for employing split-type straps on any of the eccentrics, which is especially advantageous as regards the middle eccentric.

Instead, the present invention employs an undivided single-piece circular strap 22, best seen in Fig. 2, which strap is integral with the eccentric rod 25; hence it can be endowed with considerable strength by being drop-forged; for example, from a single piece of steel. The invention thus provides the necessary margin of strength in those of the components of the driving mechanism where strength is needed most; namely, in the middle eccentric, eccentric strap and eccentric rod. The driven shaft, as usual, is unsupported directly in this region and the middle eccentric and eccentric straps are hence subjected to considerably greater strain than are the other such structures, but such strains and stresses are especially well counteracted by the novel construction in the middle portion of the present driven unit.

The middle eccentric strap 22 can, after unbolting the duplex halves and shifting the gear wheels apart laterally, be readily slipped onto the middle eccentric from the side thereof, lined up, and connected, whereupon the stud bolts 13 may be set up upon to reconstitute the duplex unit.

Each eccentric rod terminates at its far end in an eccentric head 25, pivotally mounted in a cross head 25', connected to the near end of a piston rod 28 passing through a packing gland or stuffing box 63. A single-piece cross head guide 27 is provided for the cross head and can take the form of an open-ended cylinder having guide flats 61 on the upper and lower sides of the inner surface thereof. A partition or bulkhead 62 is provided in the casing and this partition bears an annular groove 62' on one face thereof, the cross head guide cylinder 27 being provided with complementary formations 65 for mating therewith. The adjacent end of the packing gland is similarly rabbeted to provide a seat for the near end of the packing gland on the partition 62. At certain circumferential intervals around the periphery of the partition 62 stud bolts 60 are provided for the purpose of uniting the cross head guide cylinder thereto. The packing gland is provided with an annular flange 64 through which are passed stud bolts 60' for anchoring the packing glands to the partition 62 at other circumferential intervals.

When the triplex pump is operating, power applied to shaft 3 is transmitted from each of the separate pinions 4 and 5 to the corresponding toothed periphery of the duplex driven unit 10—11, thus rotating shaft 8. The member 10 of the duplex driven gear unit rotates the two left-hand eccentrics 17 and 18, while the member 11 rotates the eccentric 19, but, if desired, the order and arrangement may be reversed without departing from the scope of the invention. Many other modifications of the illustrative embodiment may be made without departing from the scope of the present inventive concepts.

I claim:

1. In a driving mechanism including a power receiving drive shaft having pinions thereon; a driven shaft associated therewith and having a duplex driven gear unit thereon, the teeth of the respective pinions and gear wheels being in mesh: an eccentric on the driven shaft between the gear wheels of said duplex unit; a connecting rod having an eccentric strap embracing said eccentric the teeth of one pinion and gear wheel meshing unit being inclined in a direction substantially opposite to the direction of inclination of the teeth of the other meshing pinion and gear wheel unit to thereby preclude and obviate side thrust of said shafts.

2. As a new article of manufacture for driving mechanisms: a one-piece integral body having a circular periphery provided with gear teeth therearound; webs integral with, and extending radially inwardly from said periphery; a stub shaft passing through the center of said body in integral relationship with said web; and an eccentric formed integrally on one of said webs.

3. As a new article of manufacture: a shaft having a journal at one end; web members integral with said shaft, said web members being spaced longitudinally of the shaft and extending radially therefrom; a circular toothed member integral with the peripheral portions of said web members; one of said web members having an eccentric circular face forming both a junction plane and an abutment member for the attachment thereto of a similar parallel article and the other of said web members having thereon an integral eccentric.

4. As a new article of manufacture: a shaft having a journal at one end and a flange at the other end for engaging another shaft; web members integral with said shaft, said web members being spaced longitudinally of the shaft and extending radially therefrom in converging relation so as to form a hollow body; a circular toothed member integral with the peripheral portions of said web members, one of said webs having a circular face forming a junction plane and an abutment member for the attachment thereto of a similar parallel article, the periphery of said circular face being formed into an eccentric.

5. A drive mechanism for a triplex pump, including: a power receiving drive shaft; not more than two pinions thereon; a driven shaft; not more than two driven gear members thereon adapted to respectively mesh with and be driven by the respective pinions; each of said driven gear members having a pump driving eccentric on its outer lateral face and integral with its hub and lying parallel to the plane of the gear; the two gear members being disengageably united along a portion of their inner sides so as to form a rigid separable duplex gear structure; and a pump driving eccentric formed on the inner face of at least one of said gear members and lying between said gear members parallel to the plane of the gear members.

6. In a triplex crank mechanism, the combination of: a pair of hollow bodies each having a peripheral gear, an outer wall and an inner wall, said outer walls each having an eccentric thereon; means for securing said inner walls rigidly and detachably together so as to form from said hollow bodies a separable duplex gear unit; bearing means for supporting said duplex gear unit for rotation; an eccentric between said hollow bodies; and a drive shaft having thereon pinions meshing with said gears.

7. In a triplex crank mechanism, the combination of: a pair of gear bodies each having a peripheral gear, an outer wall and an inner wall, said outer walls each having an eccentric thereon; means for securing said inner walls rigidly and detachably together so as to form from said gear bodies a separable duplex gear unit; bearing means for supporting said duplex gear unit for rotation; an eccentric between said gear bodies; and a drive shaft having thereon pinions meshing with said gears.

8. In a triplex crank mechanism, the combination of: a pair of hollow bodies each having a peripheral gear, an outer wall and an inner wall, said outer walls each having an eccentric thereon, the teeth of said gears respectively being spiralled in opposite directions; means for securing said inner walls rigidly and detachably together so as to form from said hollow bodies a separable duplex gear unit; bearing means for supporting said duplex gear unit for rotation; an eccentric between said hollow bodies; and a drive shaft having thereon pinions meshing with said gears.

9. In a triplex crank mechanism, the combination of: a pair of gear bodies each having a peripheral gear, an outer wall and an inner wall, said outer walls each having an eccentric thereon, the teeth of said gears respectively being spiralled in opposite directions; means for securing said inner walls rigidly and detachably together so as to form from said gear bodies a separable duplex gear unit; bearing means for supporting said duplex gear unit for rotation; an eccentric between said gear bodies; and a drive shaft having thereon pinions meshing with said gears.

ALBERT A. ASHTON.